US010803680B2

(12) United States Patent
Mrowczynski et al.

(10) Patent No.: US 10,803,680 B2
(45) Date of Patent: Oct. 13, 2020

(54) METHOD AND APPARATUS FOR INCREASING SAFETY FOR REMOTE TRIGGERING, AND MOTOR VEHICLE (71) Applicant: VOLKSWAGEN AKTIENGESELLSCHAFT, Wolfsburg (DE)

(72) Inventors: Mirko Mrowczynski, Adenbüttel (DE); Christian Becker, Braunschweig (DE); Juri Remele, Rühen (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 230 days.

(21) Appl. No.: 15/739,615

(22) PCT Filed: Jan. 14, 2016

(86) PCT No.: PCT/EP2016/050651
§ 371 (c)(1),
(2) Date: Dec. 22, 2017

(87) PCT Pub. No.: WO2016/206820
PCT Pub. Date: Dec. 29, 2016

(65) Prior Publication Data
US 2018/0182183 A1    Jun. 28, 2018

(30) Foreign Application Priority Data
Jun. 24, 2015   (DE) .................. 10 2015 211 668

(51) Int. Cl.
*H04L 29/06*   (2006.01)
*G07C 5/00*   (2006.01)
(Continued)

(52) U.S. Cl.
CPC ............. *G07C 5/008* (2013.01); *B60R 25/24* (2013.01); *G08C 17/00* (2013.01); *G08C 17/02* (2013.01);
(Continued)

(58) Field of Classification Search
CPC ....... H04L 63/12; H04L 67/12; H04L 67/125; G08C 2201/60; G08C 17/00; B60R 25/24
See application file for complete search history.

(56) References Cited

U.S. PATENT DOCUMENTS 6,806,814 B1 * 10/2004 Iverson .................. G08G 1/20
340/5.74
7,286,498 B1 * 10/2007 LaBella ................. G09B 5/12
370/312
(Continued)

FOREIGN PATENT DOCUMENTS

CN    1445681 A    10/2003
CN    1832401 A    9/2006
(Continued)

OTHER PUBLICATIONS

Bose et al., "Terminal mode: transforming mobile devices into automotive application platforms", AutomotiveUI '10: Proceedings of the 2nd International Conference on Automotive User Interfaces and Interactive Vehicular Applications, Nov. 2010 pp. 148-155, (Year: 2010).*
(Continued)

*Primary Examiner* — Morshed Mehedi
(74) *Attorney, Agent, or Firm* — Barnes & Thornburg LLP (57) ABSTRACT A method and apparatus for a motor vehicle to increase safety for remote triggering and a motor vehicle having such an apparatus. Data are received from a second device, from which there is a communication link to a first device. The
(Continued)

data are associated with user inputs in an application on the second device. The first device receives, for each user input, a portion of the data in a data packet of a data packet structure and prevents remote triggering if the data packet structure does not correspond to a predetermined data packet structure. A difference in the reception sequence of the data packets from the predetermined order is an indicator of malfunctioning in the second device. Preventing remote triggering in the event of a difference reduces the risk of remote triggering by a faulty second device and faulty remote triggering.

22 Claims, 6 Drawing Sheets (51) Int. Cl.
*H04L 29/08* (2006.01)
*G08C 17/02* (2006.01)
*G08C 17/00* (2006.01)
*B60R 25/24* (2013.01)

(52) U.S. Cl.
CPC .............. *H04L 63/12* (2013.01); *H04L 67/12* (2013.01); *H04L 67/125* (2013.01); *G08C 2201/60* (2013.01)

(56) References Cited

U.S. PATENT DOCUMENTS

| | | | | |
|---|---|---|---|---|
| 2002/0105423 | A1* | 8/2002 | Rast | B60Q 1/44 340/479 |
| 2003/0225707 | A1* | 12/2003 | Ehrman | G06Q 10/08 705/64 |
| 2005/0141681 | A1* | 6/2005 | Graiger | G05B 19/409 379/90.01 |
| 2007/0076528 | A1* | 4/2007 | Kirby | G04F 10/00 368/47 |
| 2009/0156203 | A1* | 6/2009 | Himmelstein | G06Q 10/10 455/426.1 |
| 2009/0271854 | A1* | 10/2009 | Hazlehurst | G06F 21/41 726/7 |
| 2009/0273671 | A1* | 11/2009 | Gardner | H04N 7/18 348/144 |
| 2010/0208894 | A1* | 8/2010 | True | B60R 25/24 380/270 |
| 2010/0246669 | A1* | 9/2010 | Harel | G06F 11/1004 375/240.02 |
| 2014/0162598 | A1* | 6/2014 | Villa-Real | G06Q 20/32 455/411 |
| 2015/0245198 | A1* | 8/2015 | Fliege | G08C 17/02 455/420 |
| 2015/0304840 | A1* | 10/2015 | Norman | H04W 12/06 455/411 |
| 2016/0150482 | A1* | 5/2016 | Lee | H04W 52/0258 370/311 |
| 2016/0234696 | A1* | 8/2016 | Looker | H04B 1/44 |
| 2016/0295589 | A1* | 10/2016 | Nikopour | H04W 4/023 |

FOREIGN PATENT DOCUMENTS

| | | |
|---|---|---|
| CN | 101617495 A | 12/2009 |
| CN | 101808419 A | 8/2010 |
| CN | 102025605 A | 4/2011 |
| CN | 102393975 A | 3/2012 |
| CN | 102684999 A | 9/2012 |
| CN | 102780978 A | 11/2012 |
| CN | 102823207 A | 12/2012 |
| CN | 103368691 A | 10/2013 |
| CN | 203237208 U | 10/2013 |
| CN | 103770747 A | 5/2014 |
| CN | 103954008 A | 7/2014 |
| CN | 104182697 A | 12/2014 |
| CN | 104363266 A | 2/2015 |
| CN | 104574706 A | 4/2015 |
| DE | 102008030562 A1 | 12/2009 |
| DE | 102009037234 A1 | 2/2011 |
| DE | 102010006149 A1 | 8/2011 |
| DE | 102010029931 A1 | 12/2011 |
| DE | 102012220655 A1 | 5/2013 |
| DE | 102012202934 A1 | 8/2013 |
| DE | 102013010152 A1 | 12/2013 |
| DE | 102012216919 A1 | 5/2014 |
| DE | 102012024010 A1 | 6/2014 |
| DE | 102013007055 A1 | 10/2014 |
| DE | 102014018110 A1 | 6/2015 |
| DE | 102014011802 A1 | 2/2016 |

OTHER PUBLICATIONS

Search Report for German Patent Application No. 10 2015 211 668.9, dated Jun. 16, 2016.
Search Report for International Patent Application No. PCT/EP2016/050651, dated Apr. 4, 2016.
Office Action for Chinese Patent Application No. 2016800487912; dated Aug. 30, 2019.
Office Action for Chinese Patent Application No. 201680048791.2; dated Jul. 31, 2020.

* cited by examiner

METHOD AND APPARATUS FOR INCREASING SAFETY FOR REMOTE TRIGGERING, AND MOTOR VEHICLE

PRIORITY CLAIM

This patent application is a U.S. National Phase of International Patent Application No. PCT/EP2016/050651, filed 14 Jan. 2016, which claims priority to German Patent Application No. 10 2015 211 668.9, filed 24 Jun. 2015, the disclosures of which are incorporated herein by reference in their entireties.

SUMMARY

Illustrative embodiments relate to a method and an apparatus for a motor vehicle for increasing safety for remote triggering and also to a motor vehicle with such an apparatus.

BRIEF DESCRIPTION OF THE DRAWINGS

The disclosed embodiments are explained below on the basis of the associated drawings, in which.

DETAILED DESCRIPTION

The remote triggering of functions relevant to safety, for example, the remote triggering of a parking assist system or a vehicle air-conditioning system of a motor vehicle by using a vehicle key or the remote triggering of a device of a domestic electrical installation by using application software of a user device, is increasingly gaining in importance.

In principle, remote triggering takes place as a consequence of receiving data that are associated with user inputs in an application on the second device.

Various mechanisms are known for ensuring safety in cases of remote triggering. For example, DE 10 2012 024 010 A1 describes a method for a vehicle which comprises a user identification. In DE 10 2013 010 152 A1, it is described that, at the start of a data transmission, an identification takes place on the basis of stored application software, it being possible for a device identification standard to be used in this case.

The disclosed embodiment increase safety for remote triggering.

Disclosed embodiments provide a method, a further method, an apparatus, a vehicle, and a memory device.

The method serves for increasing safety for remote triggering of a function relevant to safety of a first device as a consequence of receiving data. In this case, the data are received from a second device, from which there is a communication link to the first device. The data are associated with use inputs in an application on the second device. The method is characterized in that the first device receives for each use input a part of the data in a data packet of a data packet structure, the first device preventing remote triggering if the data packet structure does not correspond to a predetermined data packet structure.

The further method serves for remote triggering of a function relevant to safety of a first device as a consequence of receiving data relating to user inputs in an application on a second device, from which there is a communication link to the first device. The further method is characterized in that the second device sends for each user input a part of the data in a data packet of a predetermined data packet structure to the first device.

A difference in the reception sequence of the data packets from the predetermined order is an indicator of malfunctioning of the second device. Preventing remote triggering in the event of a difference therefore reduces the risk of remote triggering by a faulty second device, and consequently erroneous remote triggering.

In a disclosed embodiment of the method, it is provided that the first device also prevents remote triggering if the data packets have not been received in a predetermined time period and/or if a waiting time period between successively received data packets exceeds a maximum waiting time period. It is correspondingly provided in a disclosed embodiment of the further method that the second device sends the data packets within a predetermined time period and/or that, when sending the data packets, the second device does not exceed a maximum waiting time period between successively sent data packets.

If there is a malfunction of the second device, the time limit is more likely to be exceeded, so that the monitoring of time periods and prevention of cases of remote triggering after the time periods have elapsed further increase safety.

The second device may form a checksum for each of the data packets and add it to the respective data packet. The data packets may therefore comprise a checksum and the first device may be configured also to prevent remote triggering if in the case of one of the data packets the checksum does not match the other data in the data packet.

Checksums are efficient aids for validating individual data packets. Remote triggering is further improved in terms of safety if only a sequence of validated data packets received in the correct order can bring about remote triggering.

In addition or as an alternative, the data packets may be encoded by the second device and the first device may be configured also to prevent remote triggering if one among the data packets cannot be decoded.

In this case, the data packets may be encoded with different keys, which are assigned to positions in the predetermined order.

It is possible that the second device obtains the different keys from the first device.

The use inputs may comprise an input for launching the application, an input of a personal identification number, an input of a captcha code, an input for selecting remote triggering and/or an input for activating remote triggering. One of the data packets may comprise the personal identification number that is entered and a subsequent data packet may comprise the captcha code that is entered.

The first device may prevent remote triggering if the data packets have not been received in a predetermined order.

Unless otherwise stated in an individual case, the various embodiments mentioned in this application can be combined with one another.

The present disclosure is based on the idea that an entity in a system, for example, a vehicle, can check the plausibility of data from outside the system in such a way that the data can bring about remote triggering of a function relevant to safety without compromising the safety of the system. The present disclosure is suitable for electricals relevant to safety in accordance with ISO 26262. It makes application of this standard possible for components outside the vehicle.

The disclosed embodiments prevent individual faults or errors outside the system from leading to triggering, since the individual faults or errors change the data packet structure. On the other hand, multiple faults or errors with respect to the data packet structure that cancel one another out are much less likely.

The disclosed embodiments are based on making sure that an initial operational setup, for example, pairing of a first device, which provides the function relevant to safety, for instance, full climate control for a vehicle, and a second device, from which a user would like to trigger the function, for example, a user device, is always completed.

The disclosed embodiments divide a program sequence for remote triggering into user input operations of a predetermined order, between each of which there are operations that are performed automatically. This makes it possible to detect individual faults or errors, for example, as a result of a user input detected as erroneous or erroneous jumps in the program sequence, and consequently to detect possible risks in the remote triggering of a function relevant to safety. An entity in the vehicle can therefore check the plausibility of data from outside.

Figure 1:
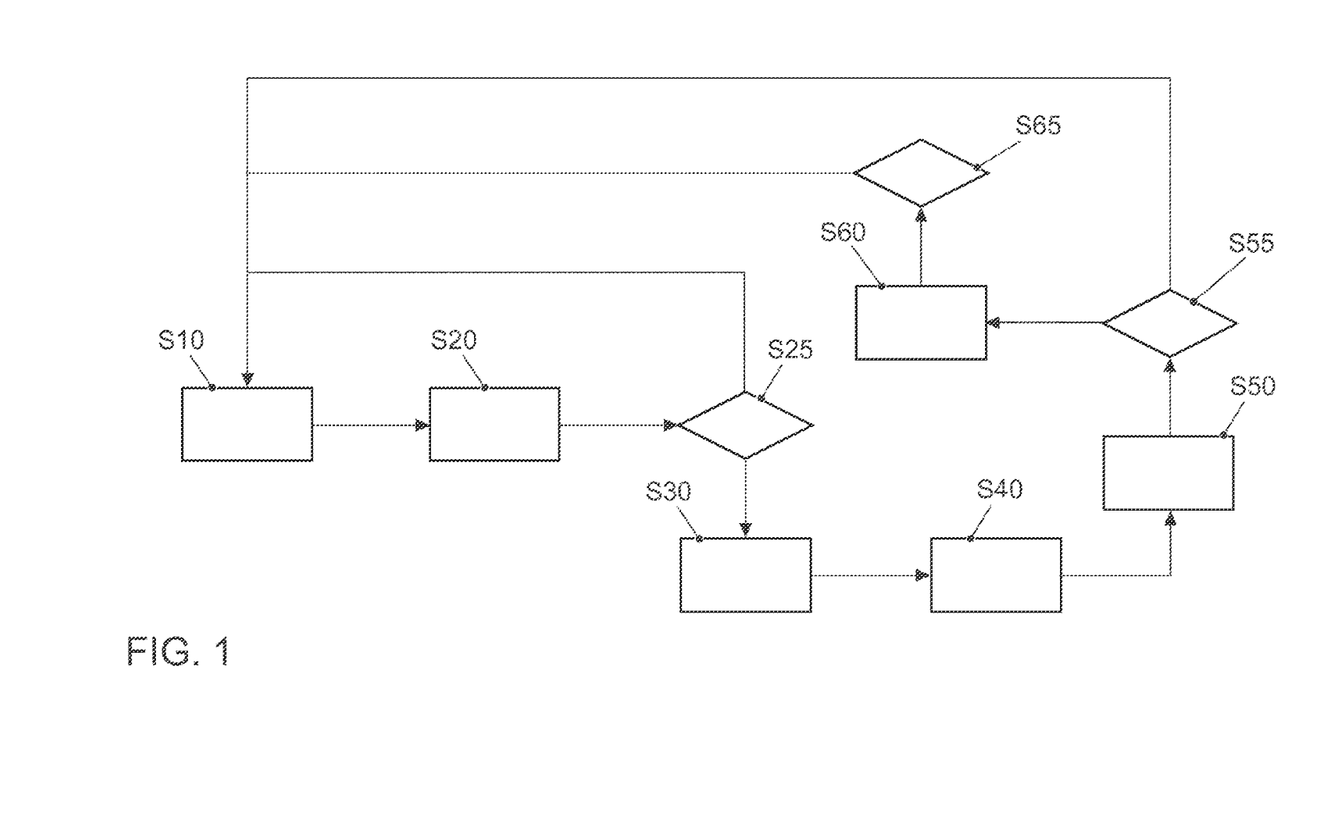
FIG. 1 shows a flow diagram according to an exemplary embodiment of a method.

The following operations, which in each case require user interaction, are performed in an exemplary embodiment that is shown in FIG. 1:

In an operation at S10, a user switches a user device (for example, a cell phone) on, unlocks the display and launches an application (application software, app) on the user device, which provides the possibility for the remote triggering of functions of another device (for example, a control device of a vehicle).

After that, in operation at S20 the user enters a personal identification number (PIN). Subsequently, the user selects a function for remote triggering. This takes place in operation at S30, which is followed by operation at S40, in which the user activates the remote triggering of the function. This activation must subsequently be confirmed in operation at S50 by typing a captcha code (Completely Automated Public Turing test to tell Computers and Humans Apart, for example, text that has been distorted by image filters).

Only after this sequence of operations can remote triggering actually take place. In the exemplary embodiment, the user device automatically sends a data packet to the control device in or after at least operations S20, S30, S40 and S50, so that a reception sequence of data packets is created. The transmission may take place, for example, in accordance with a mobile radio standard via a wireless local network (WLAN) or via BLUETOOTH®. In a disclosed embodiment given by way of example, the communication takes place exclusively via mobile radio (for example, in accordance with the Global System for Mobile Communications (GSM), Universal Mobile Telecommunications System (UMTS) or Long Term Evolution (LTE) standard). Any other wireless communication may be suppressed during the remote triggering.

In another exemplary embodiment, the user device sends all the data packets together as a block with communication security to a control device of the vehicle, a reception sequence of the data packets being determined by a sequence of the data packets in the block.

The control device checks in operation at S25 whether the PIN entered corresponds to a stored PIN, and in operation at S55 whether the captcha code entered corresponds to a stored captcha code. If one of these checks is unsuccessful, in operation at S60 the control device prevents remote triggering. In addition, a discrepancy between the PIN entered and the PIN stored may optionally have the effect that the control device activates the user device in such a way that the application is ended. If the user then still wants remote triggering, he must repeat the procedure.

The exemplary embodiment comprises a further operation at S60, in which the test device checks whether this reception sequence corresponds to a predetermined order. If this is not the case, a safety mechanism of the control device prevents remote triggering.

Matching of the reception sequence and the predetermined order is a good indication that the user device is operating faultlessly. Conversely, mismatching is an indication of a malfunction that could compromise safety.

As a development, it is possible that the PIN is transmitted while distributed over a number of data packets.

In addition or as an alternative, it is possible to provide the data packets with timestamps. The control device then optionally carries out an operation at S65, in which it is checked whether none of the time periods between successively received data packets exceeds a waiting time period and/or an overall time period between a first and a last received data packet exceeds a maximum predetermined time period. If this check shows that a time period has been exceeded, the safety mechanism of the control device may prevent remote triggering.

In addition or as an alternative, it is possible to provide the data packets with checksums, to make the integrity of the data packets verifiable.

In addition or as an alternative, it is possible to encode the data packets with a public key or various public keys of the control device in such a way that only the control device can decode the data packets. In this case, each position in the predetermined order may have its own assigned key. The difference from the predetermined order can then be deduced directly from undecodability with a key assigned to the reception position.

It is possible to develop the disclosure in such a way that the correct reception of each data packet is confirmed to the user device by the control device and the user device only sends the next data packet according to the predetermined order if the data packet directly preceding in each case has been correctly received, but otherwise resends the data packet directly preceding in each case. If encoding is used thereby, either the same key that was already used in the case of the previous sending attempt may be used for encoding the preceding data packet. Or a next key from a series of keys is used.

In disclosed embodiments, the captcha code and/or the keys may be provided by the vehicle, for example, in a data record, for example, in response to a corresponding inquiry by the user device sent in operation at S10.

The data record may be transmitted in an encrypted form. The application may in turn be designed to decrypt the data record progressively in the respective operations. The data record may be time-limited. Then or otherwise it is possible that the vehicle provides a number of data records. This improves safety-verified remote triggering if there is a poor radio link.

In the vehicle, the data records may be stored in a nonvolatile form in a memory. The captcha code may in this case be stored in a machine-interpretable form, that is to say, for example, as text represented in a distorted image.

In addition or as an alternative, it is possible that the user device and/or the vehicle authenticate(s) the other device respectively, for example, to prevent remote triggering in the wrong vehicle. For example, the user device encodes the data packets with a private key, so that the data packets are signed.

It can then be deduced from a discrepancy between the reception sequence and the predetermined order in the control device that the user device has a technical problem. If appropriate, the remote triggering by this user device can then be permanently prevented.

In a disclosed embodiment, the user device also checks the PIN itself. This may take place, for example, by evaluation of a hash function; if this gives for the PIN entered a hash value that corresponds to a stored hash value, the PIN entered is correct. The PIN then does not have to be stored in the user device itself in a nonvolatile form so that it is also not possible for other applications to access the PIN. Temporary, volatile storage of the PIN entered is sufficient and allows improved access protection.

The application may, for example, be configured to require that a touchscreen is used to enter a PIN. In this case, minimum actuation periods and/or actuation pauses, for example, 10, 20, 50 or 100 ms, may be required between individual inputs, which may require debouncing of the touchscreen. In addition or as an alternative, it may be required to enter the PIN within a maximum input time period. Entering a PIN which does not correspond to the stored hash value may lead to a lockout time, which has to be waited before the PIN can be re-entered. In addition or as an alternative, entering a series of, for example, 3, 4 or 5 PINs of which none corresponds to the stored hash value may lead to an extended lockout time or a permanent lockout. A frame surface of the touchscreen may be defined such that touching the frame surface leads to the remote triggering procedure being aborted.

Correspondingly, repeatedly entering the captcha code incorrectly may lead to a lockout time or permanent lockout. Whether entering the captcha code incorrectly just once already brings about a lockout time can be decided by the control device that evaluates the captcha code input.

A background task without interaction with the user, which transmits status information to the vehicle, for example, in response to a trigger, may run on the user device. The activation of a function relevant to safety may be such a trigger. The trigger may in this case be set directly by the application or indirectly by the vehicle, in the latter case with a time delay. The background task offers monitoring functionality on the user device. In this case, for example, status information from a reporting time period that is chosen, for example, such that the inputs for activating a function may have taken place may be reported to the vehicle.

The status information may concern, for example, a switching-on state of the display, a representation of the application in the foreground, an input possibility (was it at all possible for there to be any output?), an input status (was the touchscreen used for any inputs?), routing frequency and/or duration, input and/or output diversion and further connected devices.

In an exemplary embodiment, the user device is configured to use a different central processing unit for executing the background task than for executing the application, in this way to ensure greater safety.

By providing a division into independent parts with their own input and own data component, the disclosed embodiments do not allow erroneous jumps to lead to the sending of complete, valid data.

It is additionally possible to choose a short time period (input time period) for a last input, which triggers the sending of a last data packet, for instance, 1, 2 or 5 seconds, to increase safety further (timeout of a few seconds).

The sending in a data packet structure as provided by the disclosed embodiments also allows staggered creation and safe storage of data. There is therefore no most inopportune time.

In a further exemplary embodiment, the data packets are sent together in a block, the block being of such a size that any risk can be statistically eliminated. A reliable timer may be used for the evaluation of the block.

If the data packets are sent individually, it can be ensured that the complete message is never stored fully/at one and the same time in the memory of the user device.

The disclosed embodiments make it possible that the data packets are associated with user inputs of various kinds, that is to say, for example, display unlocking characters or keypad inputs.

In another exemplary embodiment, the communication between the user device and the device that provides the function relevant to safety may take place via a predetermined server (backend).

Figure 2:
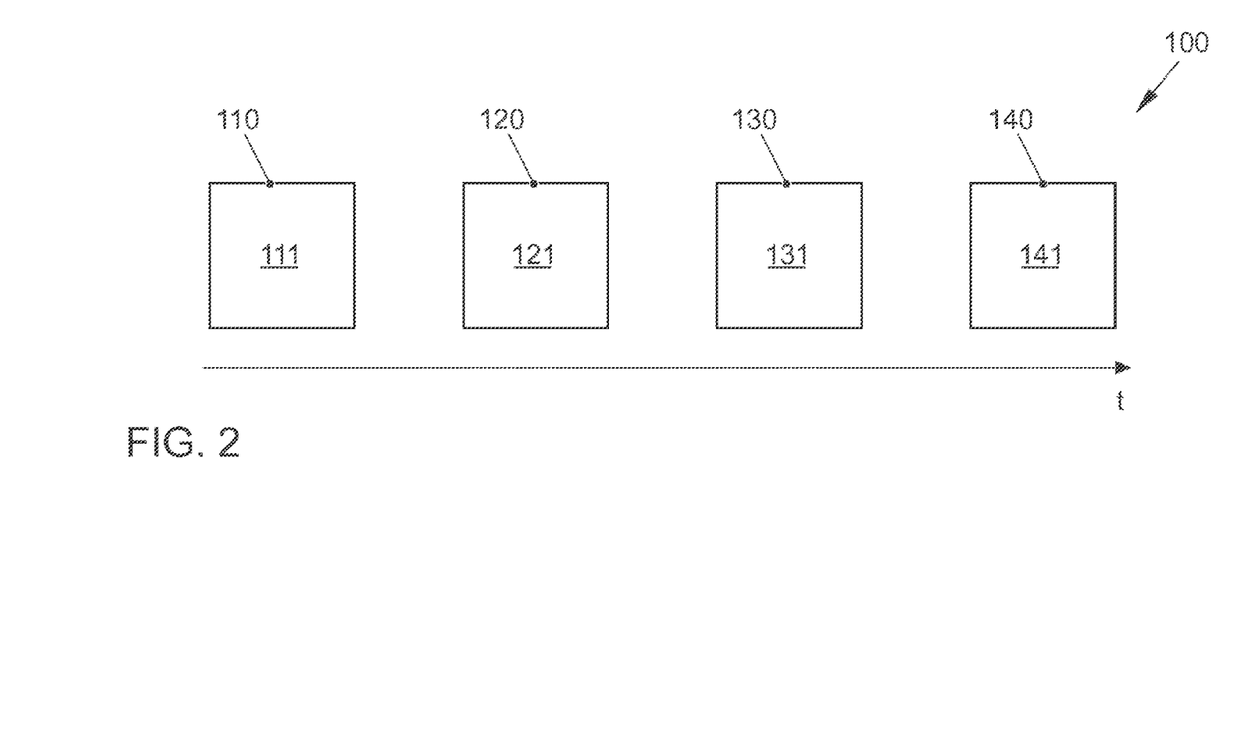
FIG. 2 shows a data packet structure according to a first exemplary embodiment.

FIG. 2 shows a data packet structure 100 according to a first exemplary embodiment. The data packet structure comprises by way of example four data packets 110, 120, 130, 140; more or fewer data packets are possible. The data packets 110, 120, 130, 140 are sent individually at time intervals. Each of the data packets 110, 120, 130, 140 contains data 111, 121, 131, 141.

Figure 3:
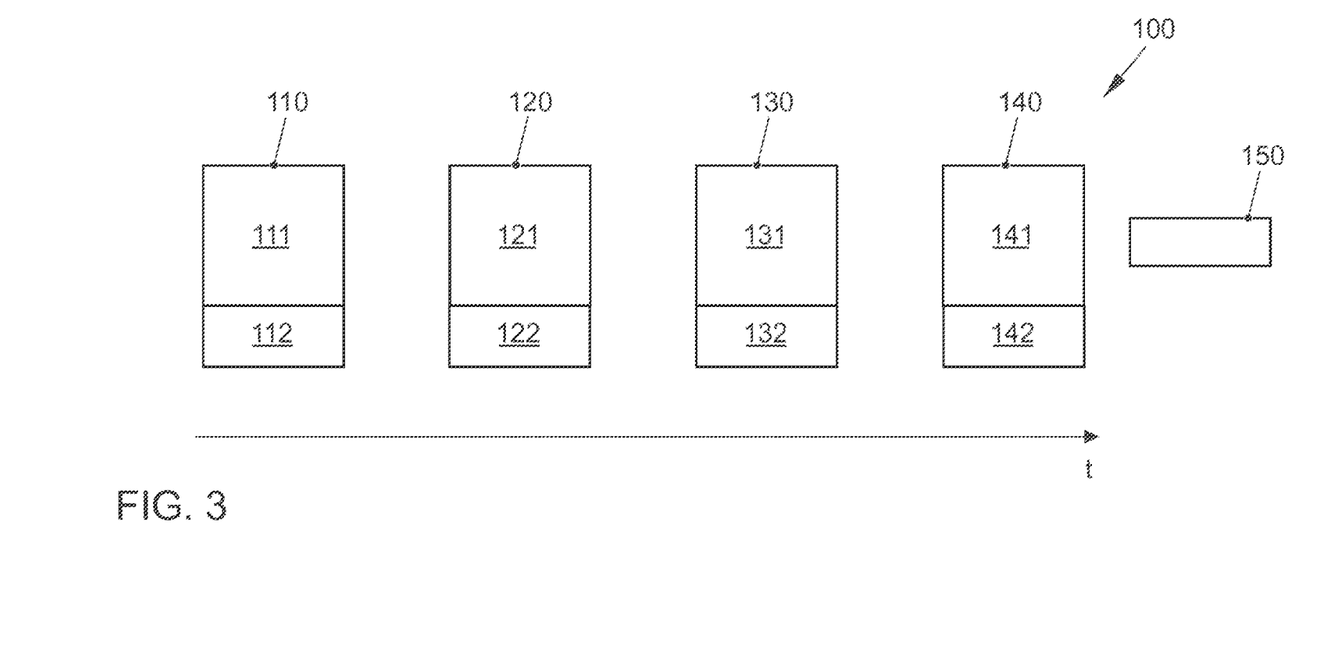
FIG. 3 shows another possible composition of the data packets.

FIG. 3 shows another possible composition of the data packets 110, 120, 130, 140. Apart from the actual data 111, 121, 131, 141, each data packet comprises a timestamp 112, 122, 132, 142. Furthermore, the data structure comprises a further data packet 150, which allows authentication of a sender and/or receiver.

Figure 4:
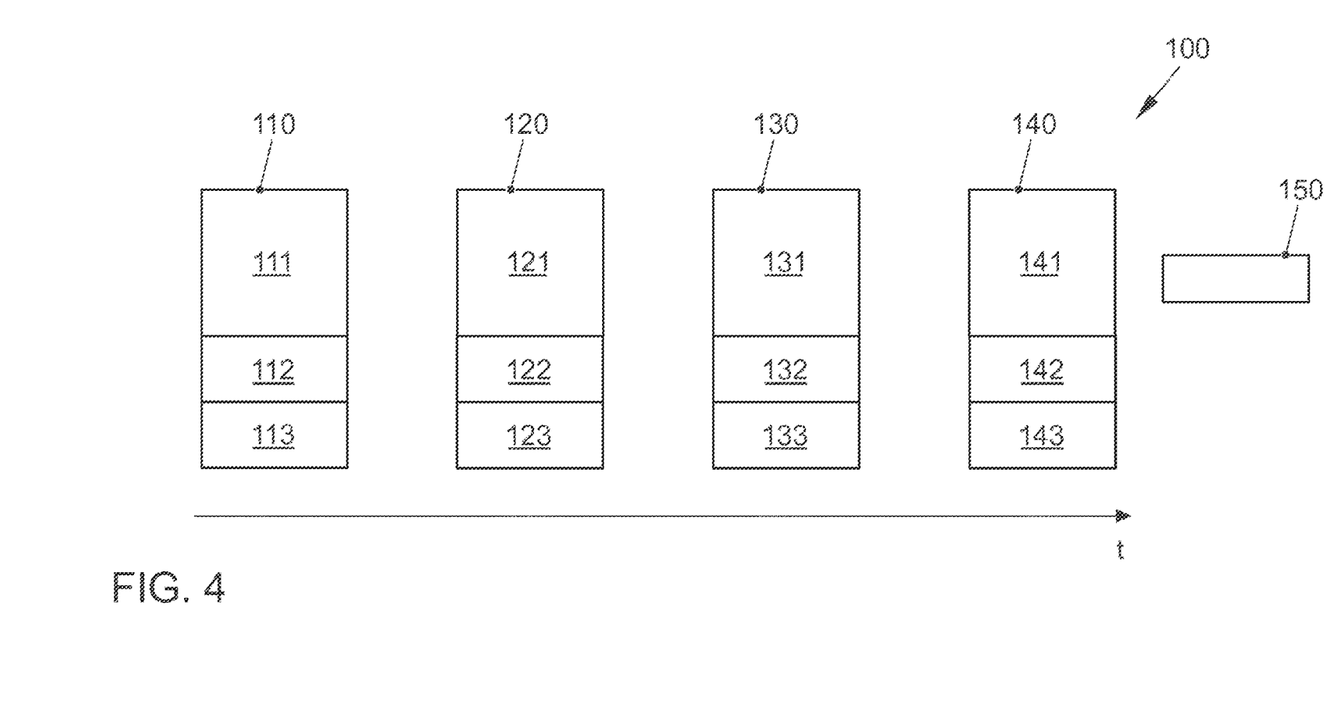
FIG. 4 shows yet another possible composition of the data packets.

FIG. 4 shows yet another possible composition of the data packets 110, 120, 130, 140. Apart from the actual data 111, 121, 131, 141, each data packet comprises a timestamp 112, 122, 132, 142 and a checksum 113, 123, 133. The data packets are in this case encoded, as a whole or each part (checksum, timestamp, data) by itself. Furthermore, the data structure comprises a further data packet 150, which allows sender and/or receiver authentication.

Figure 5:
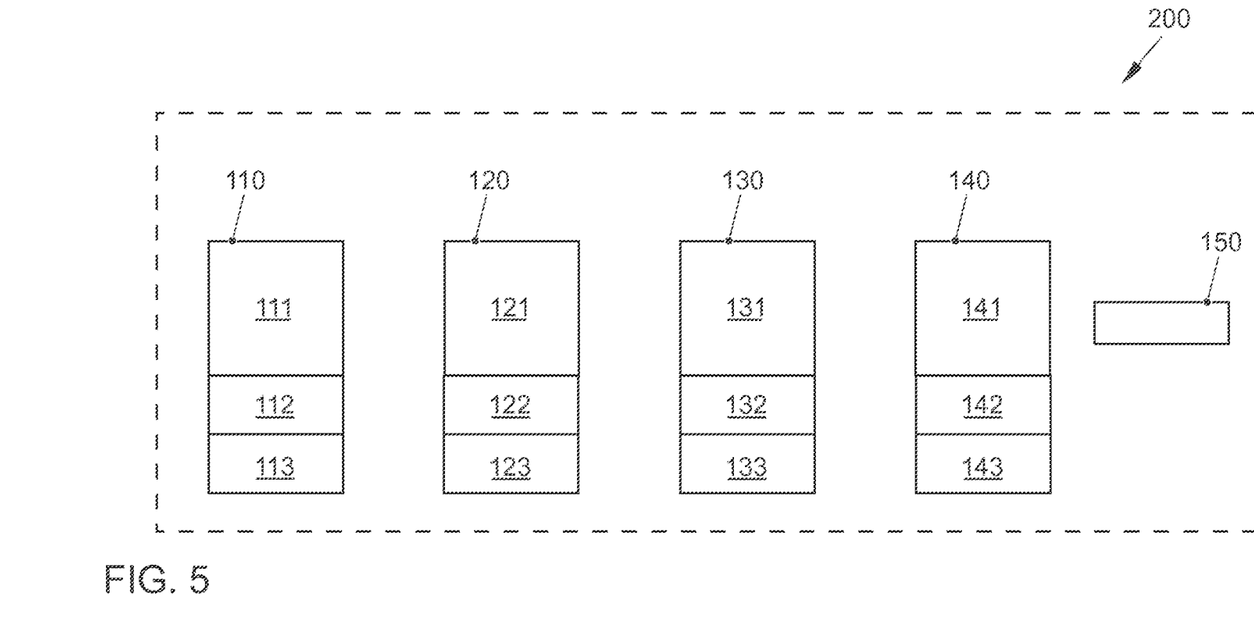
FIG. 5 shows a data packet structure according to a second exemplary embodiment.

FIG. 5 shows a data packet structure 200 according to a second exemplary embodiment. As a difference from FIG. 2, in which the data packets 110, 120, 130, 140 are sent individually one after the other, the data packet structure 200 forms a block, which optionally but not necessarily can be transmitted while using communication security. The block comprises data packets 110, 120, 130, 140, 150, which correspond to the data packets described in connection with FIG. 3.

Figure 6:
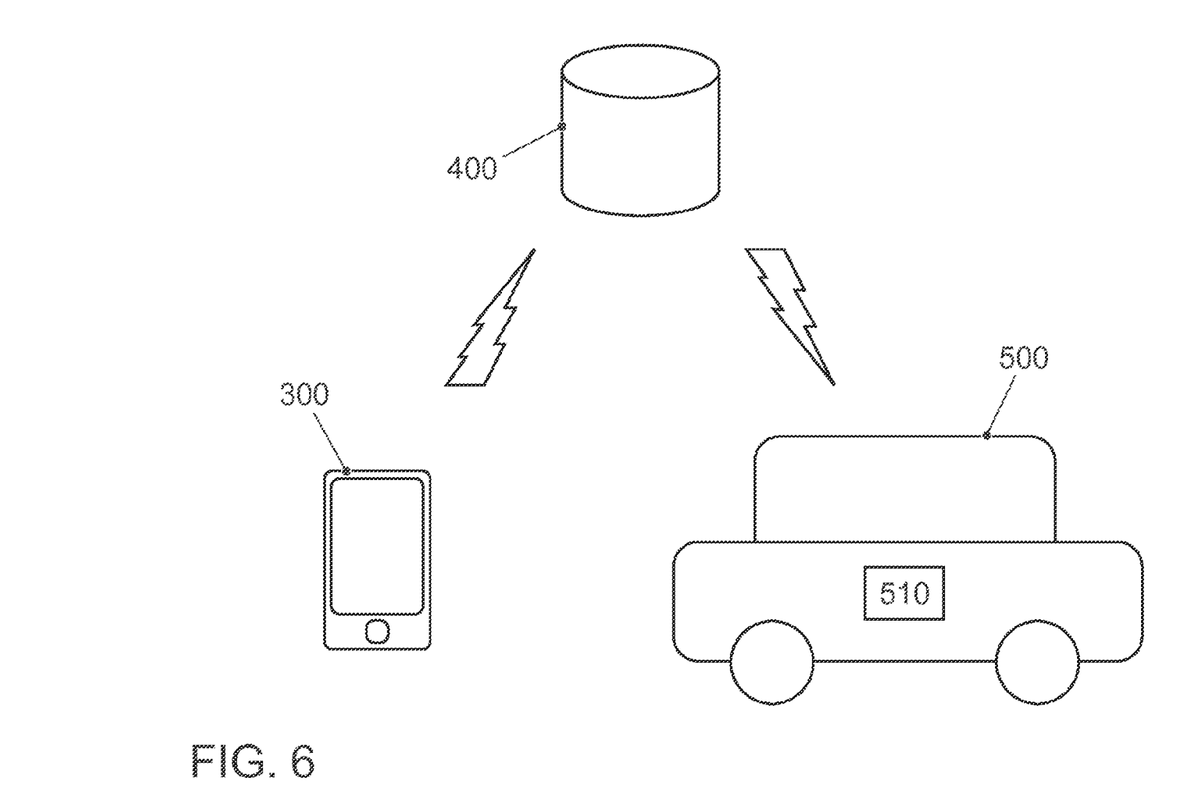
FIG. 6 shows a system according to an exemplary embodiment.

FIG. 6 shows a system according to an exemplary embodiment. In the example represented, a vehicle 500 comprises a control device 510, which allows remote triggering of a function relevant to safety of the vehicle 500 from a user device 300 via a backend server 400.

The disclosed embodiments prevent safety risks that may be initiated, for example, by an "instruction pointer jump" error. When there is a jump to a random point, the division into independent parts with their own input and own data component means that complete and/or valid data are not sent. Furthermore, a very short timeout time (for example, 1, 2 or 3 seconds) means that it can be prevented with a very high degree of probability that data of a last packet, which even in the event of a jump to a random point may be consistent, are actually sent after such a jump (before the last input expected by the user for a very limited time period).

The disclosed embodiments prevent safety risks that may be initiated, for example, by a "data are falsified or overwritten" error. By providing a division into subsequences, staggered creation and safe storage of data is made possible, so that there is no most inopportune time. In addition or as an alternative, the size of the packet to be sent can also be chosen to be so large that any risk can be statistically eliminated.

Since a packet is not sent as a result of data falsification alone, a falsification must take place after a message is generated but before it is sent, at the request of the user. The direct sending of individual subsequences after they have been generated, as takes place in embodiments that are given by way of example, reduces the possibility of falsification, for one reason also because the complete message is never present in the memory.

The disclosed embodiments prevent safety risks that may be initiated, for example, by a "CPU fault" error. For example, each of the different parts of a sequence may be realized by different commands. In this case, a set of commands that is small overall may be used, based just on commands that are also frequently used by other applications. If one of these commands is erroneously executed because the CPU is faulty, incorrect behavior of the device will also occur in the case of other applications, so that a user can notice the erroneous execution and detect the defect of the device.

The disclosed embodiments prevent safety risks that may be initiated, for example, by a "phantom inputs" error by providing a keylock, PIN, captcha code input, aborted procedure when the frame surface of the touchscreen is touched and/or timeout when there are incorrect inputs.

The disclosed embodiments also prevent a "random device on the Internet sends random content to OCU of the vehicle" error by providing communication security, by encrypting and/or signing the content, and/or only the specified server (backend) being used for reception.

Safety risks that may be initiated, for example, by a "wrong phone-to-vehicle assignment in the backend" error are likewise reliably prevented or minimized. Providing communication security for the content, with which the mobile end device only recognizes the key of a single assigned vehicle, prevents from the outset a user being able to perform actions on a vehicle other than his own or an undetected falsification subsequently being able to take place.

If the frame surface that leads to the procedure being aborted when it is touched is chosen so as to leave only an input area for entering the PIN, and if a lockout time is activated after 2, 3 or more incorrect inputs, the probability of a risk caused by a PIN error can be reduced to 1:10,000 or even lower.

If the frame surface that leads to the procedure being aborted when it is touched is chosen so as to leave only an input area for entering the captcha code, and if a lockout time is activated after 2, 3 or more incorrect inputs, the probability of a risk caused by a captcha code error can also be reduced to 1:10,000 or even lower.

Continuous phantom inputs can be actively detected if an active waiting time is required between inputs, for example, 3 seconds, during which the touchscreen must not be touched.

LIST OF DESIGNATIONS

100, 200 Data packet structure
110, 120, 130, 140 Data packets
111, 121, 131, 141 Data
112, 122, 132, 142 Timestamp
113, 123, 133, 134 Checksum
150 Further data packet
300 User device (cell phone)
400 Server (backend)
500 Vehicle
510 Control device

The invention claimed is:

1. A method for increasing safety for remote triggering of a function relevant to safety of a transportation vehicle in response to receiving data from a mobile device in communication with the transportation vehicle, the data being associated with user inputs in an application running on the mobile device, the method comprising:
   receiving, by the transportation vehicle, a plurality of data packets comprising a data packet structure, wherein each data packet corresponds to a user input of a plurality of user inputs, wherein the data packet structure corresponds to a sequence of the plurality of user inputs, and wherein the sequence includes a predefined ordering of an input for launching the application, an input of a personal identification number, an input of a captcha code, an input for selecting remote triggering and/or an input for activating remote triggering, one of the data packets comprising the personal identification number that is entered and a subsequent data packet comprising the captcha code that is entered; and
   preventing, by the transportation vehicle, remote triggering in response to the data packet structure not corresponding to a predetermined data packet structure.

2. The method of claim 1, further comprising the transportation vehicle preventing remote triggering in response to data packets of the data packet structure not having been received in a predetermined time period and/or in response to a waiting time period between successively received data packets exceeding a maximum waiting time period.

3. The method of claim 1, wherein the data packets comprise a checksum and the method further comprises the transportation vehicle also preventing remote triggering in response to the checksum for one of the data packets not matching the other data in the data packet.

4. The method of claim 1, further comprising encoding the data packets and preventing, by the transportation vehicle, remote triggering in response to one of the data packets not being decodable.

5. A method for remote triggering of a function relevant to safety of a transportation vehicle in response to receiving data relating to user inputs in an application on a mobile device, from which there is a communication link to the transportation vehicle, the method comprising:
   the mobile device sending, to the transportation vehicle, a plurality of data packets comprising a data packet structure, wherein each data packet corresponds to a user input of a plurality of user inputs, wherein the data packet structure corresponds to a sequence of the plurality of user inputs, and wherein the sequence includes a predefined ordering of an input for launching the application, an input of a personal identification number, an input of a captcha code, an input for selecting remote triggering and/or an input for activating remote triggering, one of the data packets comprising the personal identification number that is entered and a subsequent data packet comprising the captcha code that is entered, and being prevented, by the transportation vehicle, from remote triggering when the data packet structure differs from a predetermined data packet structure.

6. The method of claim 5, wherein the mobile device sends the data packets individually within a predetermined time period.

7. The method of claim 5, wherein, when sending the data packets, the mobile device does not exceed a maximum waiting time period between successively sent data packets.

8. The method of claim 5, wherein the mobile device forms a checksum for each of the data packets and adds the checksum to the respective data packet.

9. The method of claim 5, wherein the mobile device encodes the data packets.

10. The method of claim 4, wherein the data packets are encoded with different keys, which are assigned to positions in the predetermined order.

11. The method of claim 10, wherein the mobile device obtains the different keys from the transportation vehicle.

12. An apparatus for a transportation vehicle, the apparatus being configured to increase safety for remote triggering of a function relevant to safety of the transportation vehicle in response to the apparatus receiving data for user inputs in an application on an external device,
wherein the apparatus includes a communication interface from which there is a communication link for the apparatus to the external device,
wherein the apparatus is configured to receive a plurality of data packets comprising a data packet structure, wherein each data packet corresponds to a user input of a plurality of user inputs, wherein the data packet structure corresponds to a sequence of the plurality of user inputs, and wherein the sequence includes a predefined ordering of an input for launching the application, an input of a personal identification number, an input of a captcha code, an input for selecting remote triggering and/or an input for activating remote triggering, one of the data packets comprising the personal identification number that is entered and a subsequent data packet comprising the captcha code that is entered, and
wherein the apparatus prevents remote triggering in response to the data packet structure not corresponding to a predetermined data packet structure.

13. A transportation vehicle including the apparatus of claim 12.

14. A system for remote triggering a function relevant to safety of a transportation vehicle, the system comprising:
a memory device comprising instructions that are executed by a processor, wherein the processor runs software that configures the processor to
in response to receiving, by the transportation vehicle from a mobile device in communication therewith, a plurality of data packets comprising a data packet structure, wherein each data packet corresponds to a user input of a plurality of user inputs, wherein the data packet structure corresponds to a sequence of the plurality of user inputs, and wherein the sequence includes a predefined ordering of an input for launching the application, an input of a personal identification number, an input of a captcha code, an input for selecting remote triggering and/or an input for activating remote triggering, one of the data packets comprising the personal identification number that is entered, and a subsequent data packet comprising the captcha code that is entered, compare the data packet structure and a predetermined data packet structure and prevent remote triggering the transportation vehicle when the data packet structure does not correspond to the predetermined data packet structure.

15. A memory device comprising instructions that are executed by a processor, wherein a processor runs software that configures the processor to carry out a method for remote triggering of a function relevant to safety of a transportation vehicle in response to receiving data relating to user inputs in an application on a mobile device, from which there is a communication link to the transportation vehicle, the method comprising:
the mobile device sending, for each user input of a sequence of a plurality of user inputs, a part of the data in a data packet of a predetermined data packet structure to the transportation vehicle, wherein the sequence of the plurality of user inputs includes a predefined ordering of an input for launching the application, an input of a personal identification number, an input of a captcha code, an input for selecting remote triggering and/or an input for activating remote triggering, one of the data packets comprising the personal identification number that is entered and a subsequent data packet comprising the captcha code that is entered.

16. The method of claim 1, wherein the remote triggering of the function relevant to safety includes one of remote triggering of a parking assist system, remote triggering of an air-conditioning system of the transportation vehicle, and remote triggering of a device of a domestic electrical installation using application software of the user device.

17. The method of claim 5, wherein the remote triggering of the function relevant to safety includes one of remote triggering of a parking assist system, remote triggering of an air-conditioning system of the transportation vehicle, and remote triggering of a device of a domestic electrical installation using application software of the user device.

18. The system of claim 14, wherein the remote triggering of the function relevant to safety includes one of remote triggering of a parking assist system, remote triggering of an air-conditioning system of the transportation vehicle, and remote triggering of a device of a domestic electrical installation using application software of the user device.

19. The method of claim 15, wherein the remote triggering of the function relevant to safety includes one of remote triggering of a parking assist system, remote triggering of an air-conditioning system of the transportation vehicle, and remote triggering of a device of a domestic electrical installation using application software of the user device.

20. The apparatus of claim 12, wherein the apparatus prevents remote triggering in response to data packets of the data packet structure not having been received in a predetermined time period and/or in response to a waiting time period between successively received data packets exceeding a maximum waiting time period.

21. The apparatus of claim 12, wherein the data packets comprise a checksum and the method further comprises the transportation vehicle also preventing remote triggering in response to the checksum for one of the data packets not matching the other data in the data packet.

22. The apparatus of claim 12, wherein the data packets are encoded and the apparatus prevents remote triggering in response to one of the data packets not being decodable.

\* \* \* \* \*